United States Patent
Yamamoto

(10) Patent No.: US 8,345,354 B2
(45) Date of Patent: Jan. 1, 2013

(54) LENS FOR PROJECTION AND PROJECTION-TYPE DISPLAY APPARATUS

(75) Inventor: Chikara Yamamoto, Saitama (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 13/226,056

(22) Filed: Sep. 6, 2011

(65) Prior Publication Data

US 2012/0057249 A1    Mar. 8, 2012

(30) Foreign Application Priority Data

Sep. 6, 2010 (JP) ................. 2010-198835

(51) Int. Cl.
*G02B 9/00* (2006.01)
*G02B 9/62* (2006.01)

(52) U.S. Cl. ........................... 359/649; 359/761

(58) Field of Classification Search .......... 359/649–651, 359/761
See application file for complete search history.

(56) References Cited

U.S. PATENT DOCUMENTS

| | | |
|---|---|---|
| 7,075,622 B2 | 7/2006 | Narimatsu |
| 2009/0059395 A1* | 3/2009 | Lin et al. ............. 359/761 |

FOREIGN PATENT DOCUMENTS

| | | |
|---|---|---|
| JP | 2001-124988 | 5/2001 |
| JP | 2004-184932 | 7/2004 |
| JP | 2005-164839 | 6/2005 |
| JP | 2006-309076 | 11/2006 |
| JP | 2009-210596 | 9/2009 |

* cited by examiner

Primary Examiner — William Choi
(74) Attorney, Agent, or Firm — Young & Thompson

(57) ABSTRACT

A negative first lens having a concave surface facing the reduction side of a lens for projection, a positive second lens having a convex surface facing the magnification side of the lens for projection, a negative third lens having a concave surface facing the magnification side, a positive fourth lens having a convex surface facing the reduction side, a positive fifth lens, and a positive sixth lens are arranged in this order from the magnification side, and the reduction side of the optical system is telecentric. Further, the following formula (A) is satisfied: $1.2 \leq Bf/f \leq 2.5$ (A), where Bf: back focus in air of the entire lens system of the lens for projection, and f: focal length of the entire lens system.

17 Claims, 6 Drawing Sheets

EXAMPLE 1

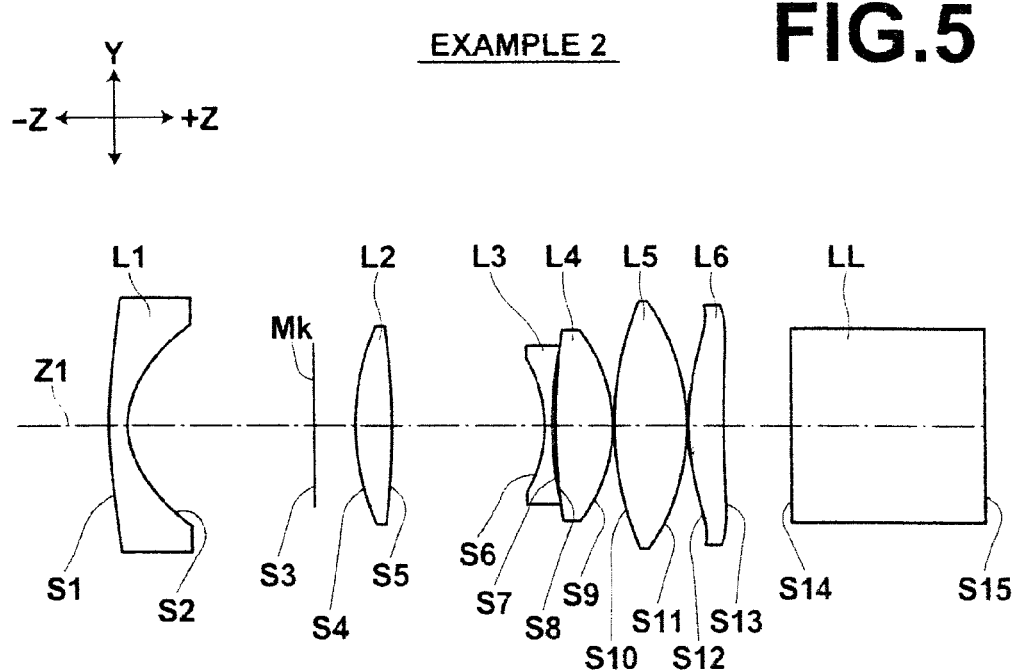
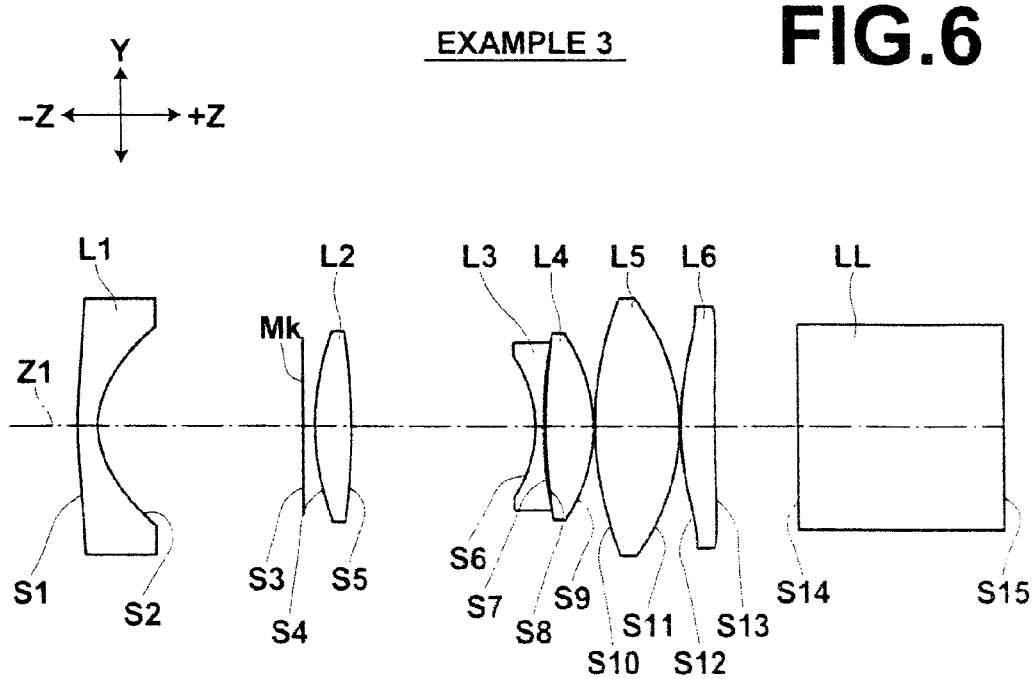

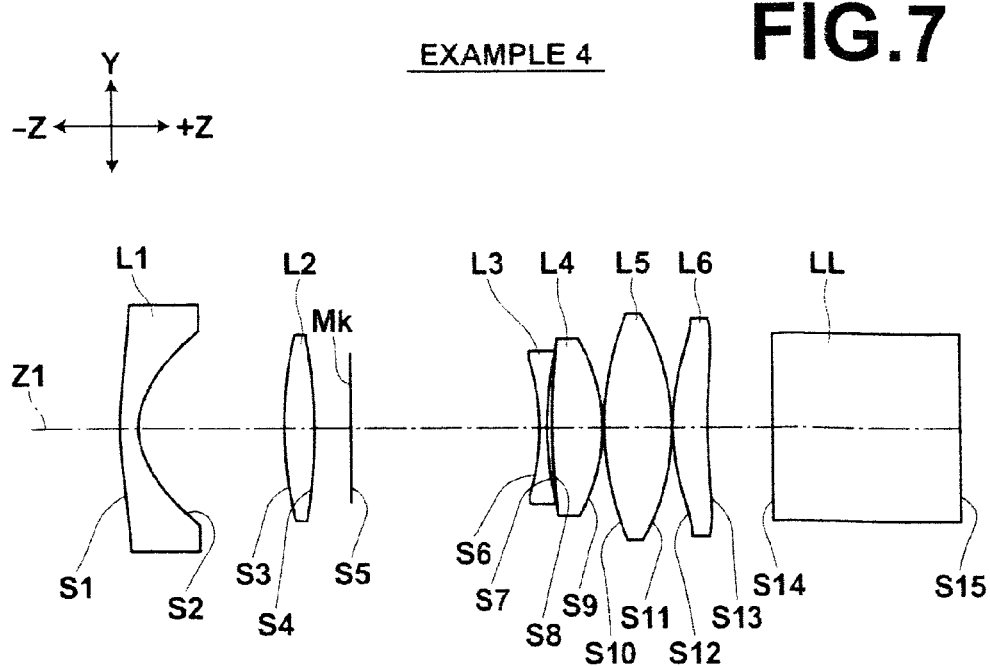
FIG.7 EXAMPLE 4
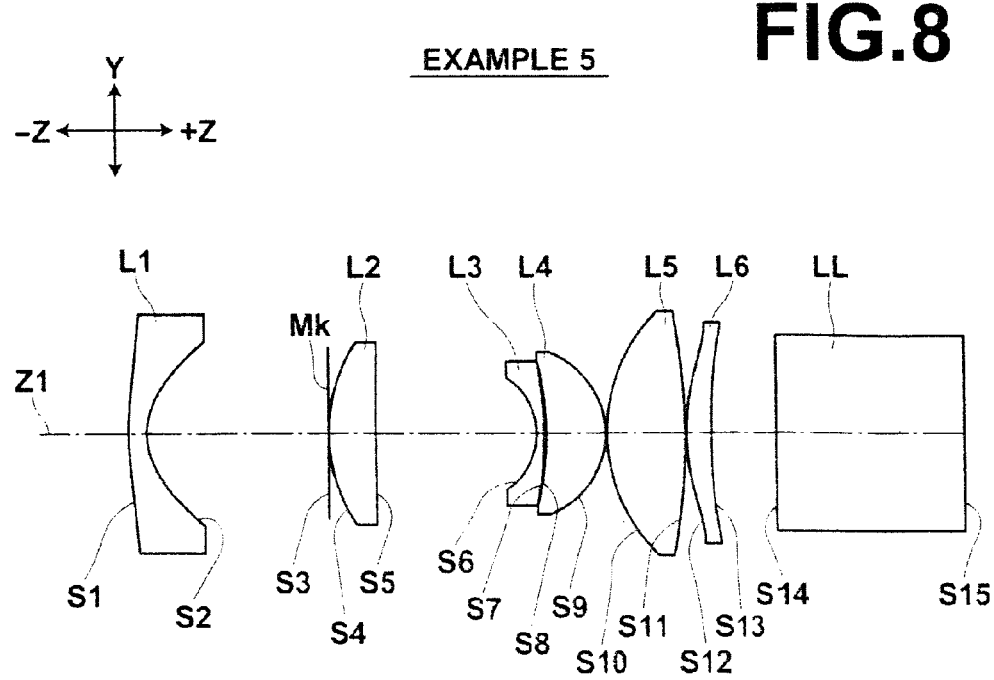
FIG.8 EXAMPLE 5

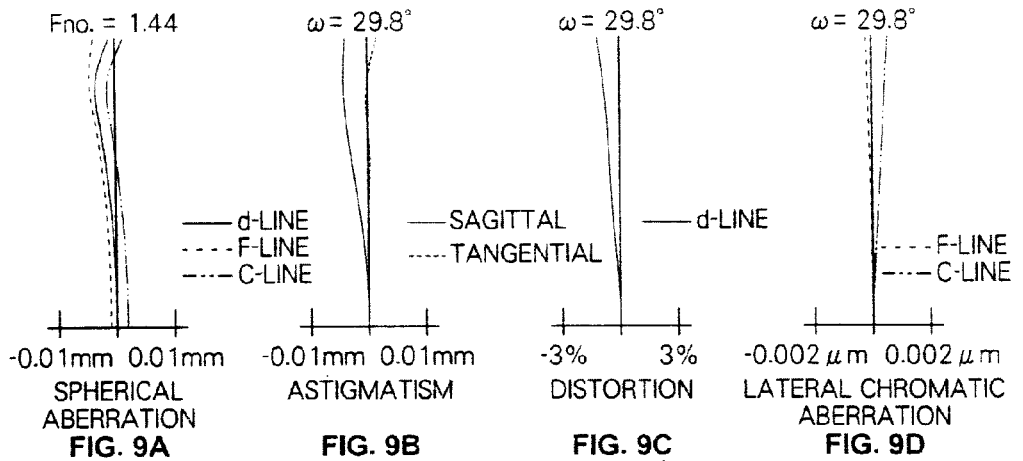
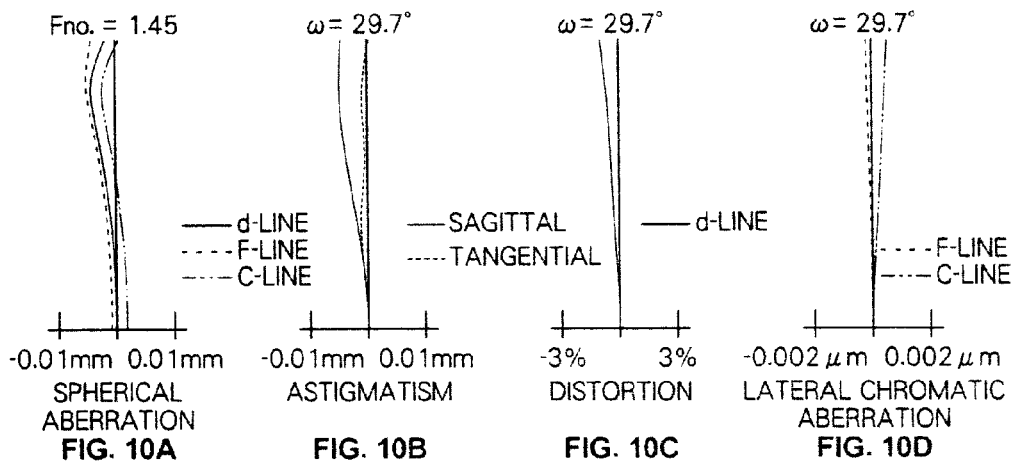
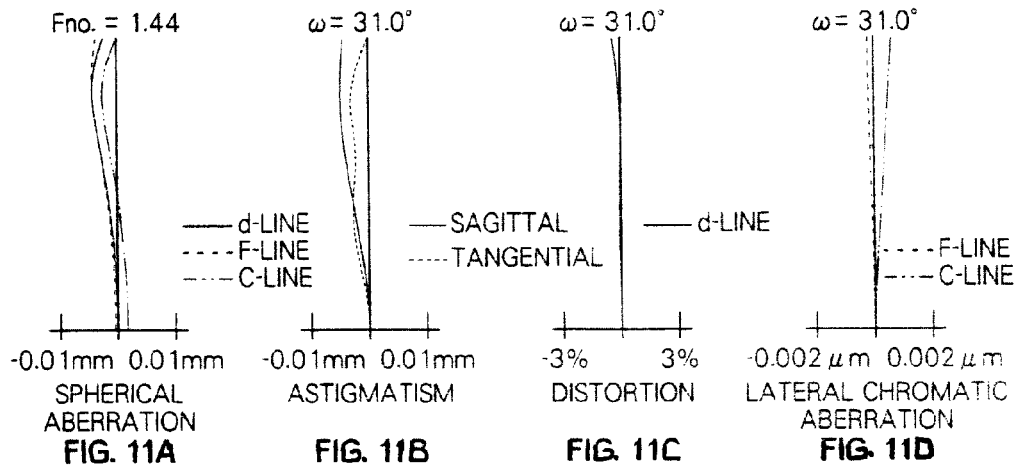

EXAMPLE 4

Fno. = 1.44
-0.01mm 0.01mm
SPHERICAL
ABERRATION
— d-LINE
---- F-LINE
----- C-LINE

ω = 29.6°
-0.01mm 0.01mm
ASTIGMATISM
— SAGITTAL
----- TANGENTIAL

ω = 29.6°
-3%    3%
DISTORTION
— d-LINE

ω = 29.6°
-0.002 μm   0.002 μm
LATERAL CHROMATIC
ABERRATION
---- F-LINE
----- C-LINE

EXAMPLE 5

Fno. = 1.44
-0.01mm 0.01mm
SPHERICAL
ABERRATION
— d-LINE
---- F-LINE
----- C-LINE

ω = 29.6°
-0.01mm 0.01mm
ASTIGMATISM
— SAGITTAL
----- TANGENTIAL

ω = 29.6°
-3%    3%
DISTORTION
— d-LINE

ω = 29.6°
-0.002 μm   0.002 μm
LATERAL CHROMATIC
ABERRATION
---- F-LINE
----- C-LINE

LENS FOR PROJECTION AND PROJECTION-TYPE DISPLAY APPARATUS

BACKGROUND OF THE INVENTION

1. Field of the Invention

The present invention relates to a lens for projection and a projection-type display apparatus, and particularly to a lens for projection substantially consisting of six lenses and a projection-type display apparatus using the lens for projection.

2. Description of the Related Art

In recent years, projection-type display apparatuses (also called as projectors) rapidly spread. The projection-type display apparatuses project images represented by image data output from personal computers or the like onto screens. As such projectors, a projector that projects, onto a screen, light that has been output from a light source and modulated by a light valve is known. As the light valve, a transmission-type liquid crystal device, a reflection-type liquid crystal device, a DMD (Digital Micromirror Device), and the like are known. In the DMD, micromirrors, the angles of which are changeable, are arranged.

Such a projector needs to have a space for structuring an optical system for guiding light output from the light source to the light valve and an optical system for guiding light modulated by the light valve to the lens for projection. Therefore, a lens for projection to be mounted on the projector has a long back focus so that such a space is provided between the lens for projection and the light valve.

For example, a projector for projecting color images, and which includes light valves for modulating red light, green light and blue light respectively, needs to have a space between the lens for projection and the light valves to arrange optical systems for guiding light of each color to respective light valves and optical systems for guiding light modulated by the light valves to a lens for projection.

For example, as a lens for projection in which a back focus for securing such a space is set, a lens for projection composed of six lenses, and which has an F-number in the range of 1.8 to 2.8 is known (please refer to Japanese Unexamined Patent Publication No. 2001-124988 (Patent Document 1), Japanese Unexamined Patent Publication No. 2005-164839 (Patent Document 2), and Japanese Unexamined Patent Publication No. 2009-210596 (Patent Document 3)).

Further, as a lens for projection composed of six lenses, and which has a small F-number (fast lens), a lens for projection with an F-number of 1.7 (please refer to Japanese Unexamined Patent Publication No. 2006-309076 (Patent Document 4), and a lens for projection with an F-number of 1.5 (please refer to Japanese Unexamined Patent Publication No. 2004-184932 (Patent Document 5)) are known.

Here, when the number of lenses is counted, if a cemented lens composed of n lenses is included, the number of lenses of the cemented lens is regarded as n.

When images are projected onto a screen through a projector, a setting place of the screen is generally made dark, but a demand for watching images without making the setting place very dark is strong. However, projectors in which lenses for projection having relatively large F-numbers, as disclosed in Patent Documents 1 through 3, are mounted do not meet such a demand. Meanwhile, a projector in which a lens for projection having a small F-number (fast lens), as disclosed in Patent Documents 4 and 5, is mounted may meet the demand, but the reduction in the F-number (faster lens) causes a problem that the size of the apparatus becomes large, and a problem that it becomes difficult to suppress generation of chromatic aberrations.

More specifically, the lens for projection (F-number: 1.7) disclosed in Patent Document 4 has a problem in the power balance of lenses. Therefore, the size of a magnification-side lens or lenses is large, and the back focus is small. Further, in the lens for projection (F-number: 1.5) disclosed in Patent Document 5, correction of spherical aberrations, especially chromatic aberrations of marginal rays, is insufficient.

SUMMARY OF THE INVENTION

In view of the foregoing circumstances, it is an object of the present invention to provide a lens for projection that can set a space between the lens for projection and a light valve to structure an optical system for guiding light output from a light source to the light valve and an optical system for guiding light modulated by the light valve to the lens for projection while suppressing generation of aberrations and an increase in the size of an apparatus to a large size, and that can reduce the F-number (faster lens). Further, it is another object of the present invention to provide a projection-type display apparatus using the lens for projection.

A lens for projection of the present invention is a lens for projection substantially consisting of six lenses, wherein the reduction side of the lens for projection is telecentric, and wherein a negative first lens having a concave surface facing the reduction side, a positive second lens having a convex surface facing the magnification side of the lens for projection, a negative third lens having a concave surface facing the magnification side, a positive fourth lens having a convex surface facing the reduction side, a positive fifth lens, and a positive sixth lens are arranged in this order from the magnification side, and wherein the following formula (A) is satisfied:

$$1.2 \leq Bf/f \leq 2.5 \qquad \text{(A), where}$$

Bf: back focus in air of the entire lens system of the lens for projection, and f: focal length of the entire lens system.

It is desirable that the lens for projection satisfies the following formula (B):

$$-2.0 \leq f3F/f \leq -0.8 \qquad \text{(B), where}$$

f3F: focal length of a magnification-side surface of the third lens.

It is more desirable that the following formula (B') is satisfied:

$$-1.8 \leq f3F/f \leq -1.0 \qquad \text{(B')}.$$

Further, it is desirable that the lens for projection satisfies the following formula (C):

$$0.0 < f/f12 \leq 0.8 \qquad \text{(C), where}$$

f12: combined focal length of the first lens and the second lens.

Further, it is more desirable that the following formula (C') is satisfied:

$$0.1 < f/f12 \leq 0.5 \qquad \text{(C')}.$$

It is desirable that the lens for projection satisfies the following formula (D):

$$1.0 \leq d12/f \leq 2.7 \qquad \text{(D), where}$$

d12: air space between the first lens and the second lens.
Further, it is more desirable that the following formula (D') is satisfied:

$$1.4 \leq d12/f \leq 2.5 \qquad (D')$$

In a lens for projection, it is desirable that a gap is provided between a reduction-side surface of the third lens and a magnification-side surface of the fourth lens, and that the following formula (E) is satisfied:

$$f34n/f \leq -2.5 \qquad (E), \text{where}$$

f34n: focal length of an air lens formed between the reduction-side surface of the third lens and the magnification-side surface of the fourth lens.

Further, it is more desirable that the following formula (E') is satisfied:

$$f34n/f \leq -4.0 \qquad (E').$$

The focal length of an air lens is a combined focal length in air of the focal length of the magnification-side surface of the air lens and the focal length of the reduction-side surface of the air lens. Specifically, the focal length of an air lens is represented by the following equation:

1/Focal Length of Air Lens=(1−Refractive Index of Magnification-Side Lens)/Radius of Curvature of Magnification-Side Surface of Air Lens+(Refractive Index of Reduction-Side Lens)/Radius of Curvature of Reduction-Side Surface of Air lens+(1−Refractive Index of Magnification-Side Lens)×(1−Refractive Index of Reduction-Side Lens)×Air Space/(Radius of Curvature of Magnification-Side Surface of Air lens×Radius of Curvature of Reduction-Side Surface of Air lens).

It is desirable that the lens for projection satisfies the following formula (F):

$$Fno \leq 1.7 \qquad (F), \text{where}$$

Fno: F-number of the entire lens system.

It is desirable that at least a surface of the first lens is aspheric.

It is desirable that at least one of surfaces constituting the fifth lens or the sixth lens is aspheric.

It is desirable that the first lens and the six lens are made of resin, and that the following formula (G) is satisfied:

$$-0.7 < f1/f6 \leq -0.1 \qquad (G), \text{where}$$

f1: focal length of the first lens, and
f6: focal length of the sixth lens.

Further, a projection-type display apparatus of the present invention is a projection-type display apparatus comprising:
 a lens for projection of the present invention;
 a light source; and
 a light valve that modulates rays of light output from the light source,
 wherein the rays of light modulated by the light valve are projected through the lens for projection.

The lens for projection may be composed of only single lenses. Alternatively, the lens for projection may include a cemented lens or cemented lenses.

The expression "the reduction side is telecentric" represents a state in which a line bisecting the angle of each cross section of rays of light passing through all positions on an image circle in a cross section of rays of light condensing into an arbitrary reduction-side point, as illustrated in a cross section of FIG. 4 (Example 1), is nearly parallel to an optical axis. Therefore, the state is not limited to a completely telecentric state. In other words, the state is not limited to a state in which the line bisecting the angle is completely parallel to the optical axis, and some difference may be present. Here, some difference means that the inclination of the bisecting line with respect to the optical axis is within the range of ±3°.

When the number of lenses is counted, if a cemented lens composed of n lenses is included, the number of lenses of the cemented lens is regarded as n. Meanwhile, an air lens is not counted when the number of lenses is counted.

Back focus is a length (in air) on an optical axis between a most-reduction-side lens surface of lens surfaces constituting the lens for projection and a focal point on the reduction side of the lens for projection.

The focal length of each lens and the focal length of plural lenses in combination (combined focal length) are classified into positive and negative. The focal length of a lens or lenses is regarded as being positive when a focal point of rays passed through the lens or lenses is located on the exit side of the lens or lenses. The focal length of a lens or lenses is regarded as being negative when a focal point of rays passed through the lens or lenses is located on the incident side of the lens or lenses.

Focal length Fsurf of a lens surface is obtained by using the following equation:

$$Fsurf = r/(n2-n1), \text{where}$$

n1 is the refractive index of a medium on the magnification side of the lens surface,
n2 is the refractive index of a medium on the reduction side of the lens surface, and
r is the radius of curvature of the lens surface.

The radius of curvature is positive when the surface is convex toward the magnification side, and negative when the surface is convex toward the reduction side.

Further, the term "reduction-side surface of a lens" means a lens surface formed on the reduction side of the lens. Further, the term "magnification-side surface of a lens" means a lens surface formed on the magnification side of the lens.

With respect to aspheric lenses, the term "positive" and the term "negative" are used to refer to whether a paraxial region of an aspheric lens is positive or negative. Further, with respect to aspheric surfaces, the term "positive", the term "negative", the term "concave", and the term "convex" are used to refer to whether a paraxial region of an aspheric surface is positive or negative, and concave or convex.

Further, the expression "a lens for projection substantially consisting of n lenses" includes lenses for projection which are equipped with: lenses substantially without any power; optical elements other than lenses, such as apertures and glass covers; and mechanical components, such as lens flanges, lens barrels, imaging elements, and camera shake correcting mechanisms; in addition to the n lenses.

According to a lens for projection and a projection-type display apparatus of the present invention, the lens for projection substantially consists of six lenses, and the reduction side of the lens for projection is telecentric. Further, a negative first lens having a concave surface facing the reduction side, a positive second lens having a convex surface facing the magnification side of the lens for projection, a negative third lens having a concave surface facing the magnification side, a positive fourth lens having a convex surface facing the reduction side, a positive fifth lens, and a positive sixth lens are arranged in this order from the magnification side, and the following formula (A) is satisfied:

$$1.2 \leq Bf/f \leq 2.5 \qquad (A), \text{where}$$

Bf: back focus in air of the entire lens system of the lens for projection, and
f: focal length of the entire lens system.

Therefore, it is possible to obtain a lens having a smaller F-number (faster lens), while suppressing generation of aberrations and an increase in the size of an apparatus to a large size.

Specifically, in the present invention, the arrangement of positive and negative lenses (power balance) is appropriately set as described above. Therefore, it is possible to maintain the balance of aberrations in an excellent manner, while constituting the lens for projection using a small number of lenses (six lenses). Further, it is possible to provide a lens for projection that has a small F-number (fast lens) without causing the size of an apparatus to become large. Therefore, it is possible to obtain a lens for projection that is small in size and light in weight, and that has excellent performance.

If the lens for projection is constructed in such a manner that the value of Bf/f is lower than the lower limit defined by the formula (A), which defines the range of the ratio of back focus Bf to focal length f of the entire lens system, a space for arranging an optical system for illumination and an optical system for guiding light, or the like becomes small. The optical system for illumination guides light output from a light source to a light valve, and the optical system for guiding light guides light modulated by the light valve to the lens for projection. Consequently, it becomes difficult to arrange an optical system for illumination and an optical system for guiding light.

In contrast, if the lens for projection is constructed in such a manner that the value of Bf/f exceeds the upper limit defined by the formula (A), the size of the apparatus of the lens for projection becomes large.

BRIEF DESCRIPTION OF THE DRAWINGS

FIG. 5 is a schematic cross section illustrating the structure of a lens for projection in Example 2;

FIG. 6 is a schematic cross section illustrating the structure of a lens for projection in Example 3;

FIG. 7 is a schematic cross section illustrating the structure of a lens for projection in Example 4 (when the value of f3F/f is lower than the lower limit defined by the formula (B));

FIG. 8 is a schematic cross section illustrating the structure of a lens for projection in Example 5 (when the value of f3F/f exceeds the upper limit defined by the formula (B));

FIGS. 9A, 9B, 9C and 9D are diagrams illustrating various aberrations of the lens for projection in Example 1;

FIGS. 10A, 10B, 10C and 10D are diagrams illustrating various aberrations of the lens for projection in Example 2;

FIGS. 11A, 11B, 11C and 11D are diagrams illustrating various aberrations of the lens for projection in Example 3;

DESCRIPTION OF THE PREFERRED EMBODIMENTS

Hereinafter, a lens for projection of the present invention and a projection-type display apparatus including the lens for projection will be described with reference to drawings.

Figure 1:
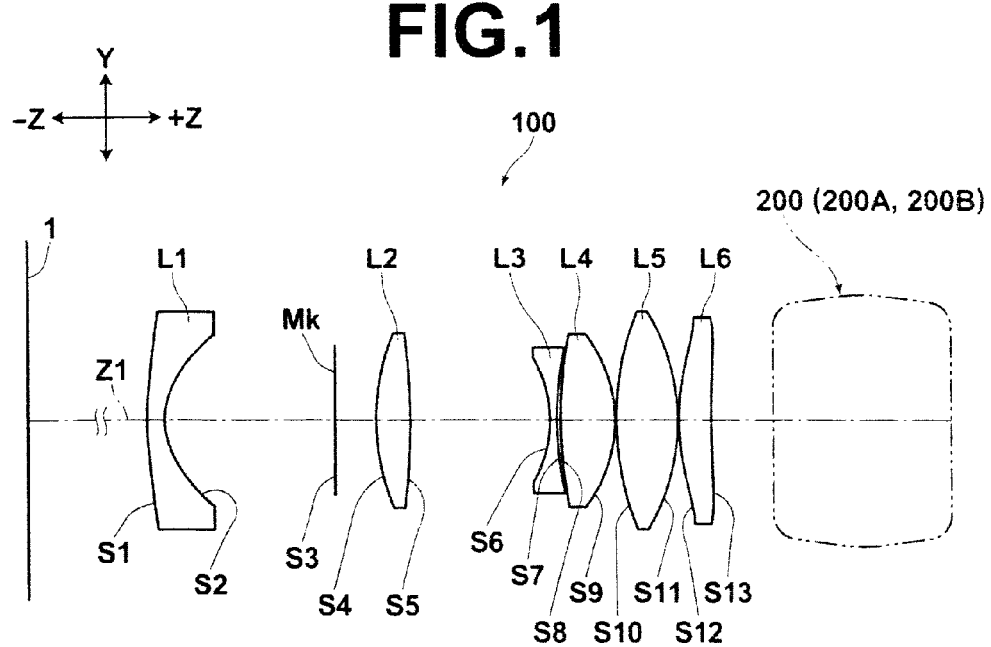
FIG. 1 is a schematic cross section illustrating the structure of a projection-type display apparatus including a lens for projection according to an embodiment of the present invention.

FIG. 1 is a schematic cross section illustrating the structure of a projection-type display apparatus including a lens for projection of the present invention.

A projection-type display apparatus 400 illustrated in FIG. 1 includes a lens 100 for projection and a light modulation unit 200. The light modulation unit 200 modulates, by a light valve, rays of light output from a light source. The rays of light modulated in the light modulation unit 200 are passed through the lens 100 for projection, and projected onto a screen 1.

<Basic Structure of Lens for Projection>

Next, the basic structure of the lens 100 for projection will be described.

The lens 100 for projection substantially consists of six lenses. In the lens 100 for projection, negative first lens L1 having a concave surface facing the reduction side of the lens for projection (the side indicated by arrow +Z in FIG. 1), positive second lens L2 having a convex surface facing the magnification side of the lens for projection (the side indicated by arrow −Z in FIG. 1), negative third lens L3 having a concave surface facing the magnification side, positive fourth lens L4 having a convex surface facing the reduction side, positive fifth lens L5, and positive sixth lens L6 are arranged in this order from the magnification side.

The lens 100 for projection is an optical system the reduction side of which is telecentric, and satisfies the following formula (A):

$$1.2 \leq Bf/f \leq 2.5 \quad \quad (A),\text{ where}$$

Bf: back focus in air of the entire lens system of the lens for projection, and f: focal length of the entire lens system.

Further, the lens 100 for projection may include mask Mk.

The mask Mk is made of a material that blocks rays passing through the lens 100 for projection. For example, the mask Mk blocks marginal rays, which pass through a peripheral area of the lens 100 for projection, to secure the telecentricity of the lens 100 for projection. Alternatively, the mask Mk is provided to set an F-number. The mask Mk illustrated in the diagrams does not necessarily represent the size nor the shape of the mask, but a position at which the mask is located in the direction of an optical axis.

The back focus Bf is a length (in air), on an optical axis, from a last lens surface of lenses constituting the lens 100 for projection (a lens surface arranged closest to the light modulation unit 200 among lens surfaces) to a rear-side focal point (a focal point of the lens 100 projection set on the light modulation unit 200 side).

Here, the back focus Bf corresponds to a length (in air), on an optical axis, from lens surface S13 to a light valve (a DMD 210 and liquid crystal panels 260R through 260B, which will be described later). The lens surface S13 is located on the most reduction side among lens surfaces constituting the lens 100 for projection.

Next, the light modulation unit 200 will be described.

<Regarding a Light Modulation Unit Using a DMD as a Light Valve>

Figure 2:
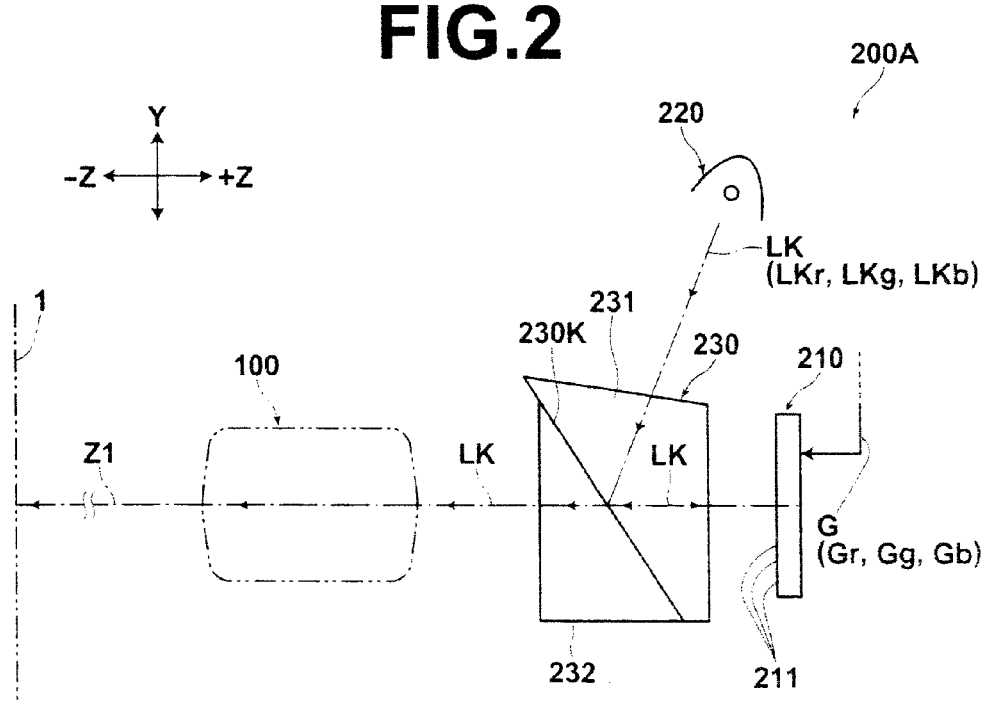
FIG. 2 is an enlarged cross section of a light modulation unit included in a projection-type display apparatus.

FIG. 2 is a diagram illustrating a light modulation unit adopting a DMD (Digital Micromirror Device) as a light valve.

A light modulation unit 200A illustrated in FIG. 2 includes a DMD 210, a light source 220, and a total internal reflection prism (hereinafter referred to as a TIR prism 230). The TIR prism 230 guides rays Lk of light output from the light source 220 to the DMD 210.

The rays Lk of light output from the light source 220 enter the TIR prism 230, and are totally reflected at a boundary plane 230K between two prisms 231, 232 constituting the TIR prism 230. The totally reflected rays Lk of light enter the DMD 210. Further, the rays Lk of light that have entered the DMD 210 are reflected by a multiplicity of micromirrors 211 constituting the DMD 210, and modulated. Specifically, the micromirrors 211 deflect rays Lk of light, based on image data G input to the DMD 210, to an ON direction (the direction of the lens 100 for projection) or to an OFF direction (a direction other than the direction of the lens 100 for projection). Accordingly, the rays Lk of light that have entered the DMD 210 are modulated.

The rays Lk of light modulated by the DMD 210 pass through the TIR prism 230, and enter the reduction side (the side indicated by arrow +Z in FIG. 2) of the lens 100 for projection. Further, the rays Lk of light are output from the magnification side (the side indicated by arrow -Z in FIG. 2) of the lens 100 for projection, and projected onto a screen 1. Accordingly, rays Lk of light modulated by the DMD 210 and magnified by the lens 100 for projection are projected onto the screen 1. Consequently, an image represented by image data input to the DMD 210 is formed on the screen 1.

Here, it is possible to display a color image on the screen 1, for example, by adopting a field sequential image display method. In the field sequential image display method, red rays Lkr of light output from the light source 220, green rays Lkg of light output from the light source 220, and blue rays Lkb of light output from the light source 220 are temporally divided (time division), and caused to sequentially enter the DMD 210. Further, image data Gr representing a red image, image data Gg representing a green image, and image data Gb representing a blue image are input to the DMD 210 synchronously with entrance of the rays of light of respective colors into the DMD 210, and the rays of light of respective colors are modulated.

<Regarding a Light Modulation Unit Using a Liquid Crystal Panel as a Light Valve>

Figure 3:
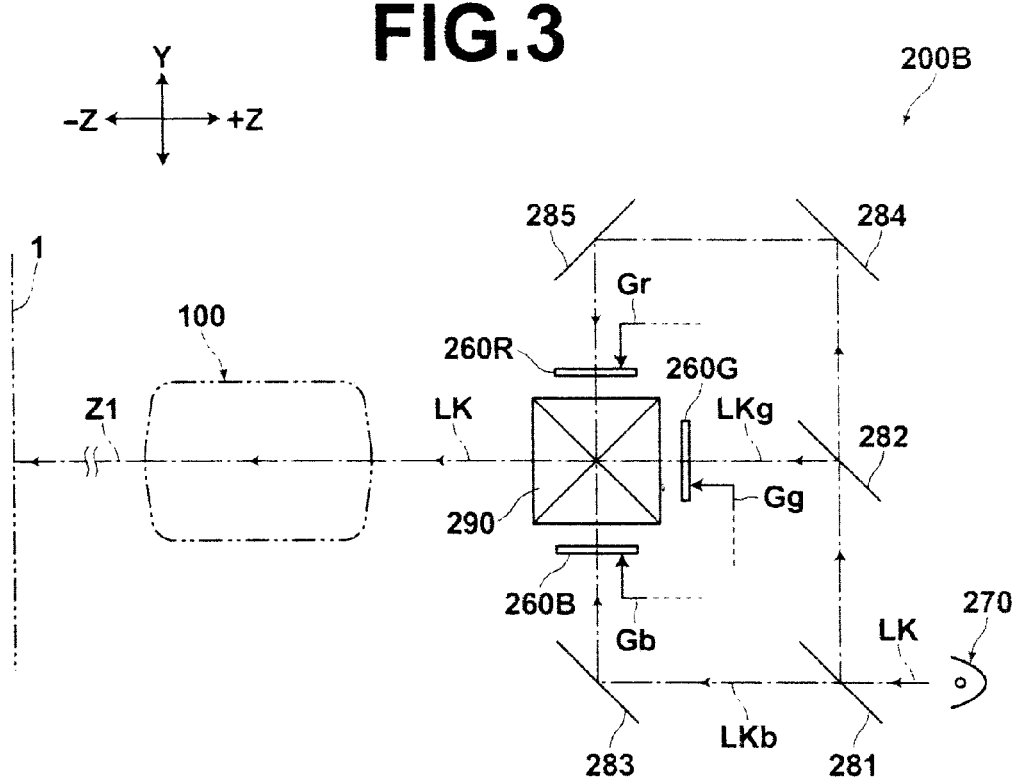
FIG. 3 is an enlarged cross section of another light modulation unit included in a projection-type display apparatus.

FIG. 3 is a diagram illustrating a light modulation unit using a transmission-type liquid crystal panel as a light valve.

A light modulation unit 200B illustrated in FIG. 3 includes a light source 270, dichroic mirrors 281, 282, liquid crystal panels 260R, 260G, 260B, and a dichroic prism 290 for combining colors. The light source 270 outputs white light, and the dichroic mirrors 281, 282 separate the rays Lk of white light output from the light source 270 into red light, green light and blue light. The liquid crystal panels 260R, 260G, 260B modulate the rays Lk of light separated into respective colors (red rays Lkr of light, green rays Lkg of light, and blue rays Lkb of light). Further, the dichroic prism 290 combines, into a bundle of rays Lk of light, the rays Lk of light of respective colors (red rays Lkr of light, green rays Lkg of light, and blue rays Lkb of light) that have been modulated by being transmitted through the liquid crystal panels 260R, 260G, 260B.

The white light output from the light source 270 is separated into rays Lk of light of respective colors of red, green and blue (red rays Lkr of light, green rays Lkg of light, and blue rays Lkb of light) by the dichroic mirrors 281, 282. Further, the separated rays enter the liquid crystal panels 260R, 260G, 260B, respectively, through the total reflection mirrors 283, 284, 285, or the like.

The red rays Lkr of light, the green rays Lkg of light, and the blue rays Lkb of light modulated through the liquid crystal panels 260R, 260G, 260B are combined into a bundle of rays Lk of light through the dichroic prism 290 for combining colors.

The red rays Lkr of light, the green rays Lkg of light, and the blue rays Lkb of light are modulated, through the liquid crystal panels 260R, 260G, 260B, based on image data Gr, Gg, Gb input to the liquid crystal panels 260R, 260G, 260B, respectively.

The rays Lk of light combined through the dichroic prism 290 for combining colors enter the reduction side (the side indicated by arrow +Z in FIG. 3) of the lens 100 for projection, and are output from the magnification side (the side indicated by arrow -Z in FIG. 3) of the lens 100 for projection. Further, the rays Lk of light are projected onto the screen 1. Accordingly, a color image represented by image data input to each of the liquid crystal panels 260R, 260G, 260B is formed on the screen 1.

<Regarding Structure Further Limiting the Basic Structure of the Lens for Projection>

Next, elements or features that further limit the basic structure of the illustrated lens 100 for projection and the projection-type display apparatus 400, and the actions and the effects of the elements or features will be described. The elements or features that further limit the basic structure are not essential to the lens 100 for projection of the present invention nor to the projection-type display apparatus 400 of the present invention.

The lens for projection of the present invention and the projection-type display apparatus of the present invention may satisfy all of the elements or features that further limit the basic structure. Alternatively, only one of the elements or features, or at least two of the elements or features in combination may be satisfied.

First, the meanings of parameters represented by signs in formulas will be described:

Bf: back focus;
f: focal length of entire lens system;
f3F: focal length of a magnification-side surface of the third lens;
f12: combined focal length of the first lens and the second lens;
d12: air space between the first lens and the second lens;
f34n: focal length of an air lens formed between the reduction-side surface of the third lens and the magnification-side surface of the fourth lens;
Fno: F-number of the entire lens system;
f1: focal length of the first lens; and
f6: focal length of the sixth lens.

[Structure Limited by Formula (B)]

The formula (B): $-2.0 \leq f3F/f \leq -0.8$, and the formula (B'): $-3.0 \leq f3F/f \leq -1.4$, which is more desirable than the formula (B), regulate the range of the ratio of focal length f3F of a magnification-side surface of the third lens to the focal length f of the entire lens system (lens 100 for projection).

When the lens 100 for projection is constructed in such a manner that the value of f3F/f is lower than the lower limit defined by the formula (B), correction of spherical aberrations, especially correction of chromatic aberrations of marginal rays, becomes difficult.

In contrast, if the lens 100 for projection is constructed in such a manner that the value of f3F/f exceeds the upper limit defined by the formula (B), it becomes difficult to correct image planes while maintaining back focus.

If the lens 100 for projection is constructed so as to satisfy the formula (B) or the formula (B'), it is possible to suppress generation of such a problem. When the lens 100 for projection is constructed so as to satisfy the formula (B'), it is possible to obtain more desirable lens characteristics than the case of satisfying the formula (B).

[Structure Limited by Formula (C)]

The formula (C): $0.0 < f/f12 \leq 0.8$ and the formula (C'): $0.1 < f/f12 \leq 0.5$, which is more desirable than the formula (C), regulate the range of the ratio of focal length f of the entire lens system to combined focal length f12 of the first lens and the second lens.

When the lens 100 for projection is constructed in such a manner that the value of f/f12 is lower than the lower limit defined by the formula (C), correction of an image plane becomes difficult.

In contrast, when the lens 100 for projection is constructed in such a manner that the value of f/f12 exceeds the upper limit defined by the formula (C), it becomes difficult to make the reduction side of the optical system telecentric. Further, there is a problem that the size of a lens or lenses becomes large. Especially, the size of a lens or lenses arranged on the reduction side becomes large.

If the lens 100 for projection is constructed so as to satisfy the formula (C) or (C'), it is possible to suppress generation of such a problem. When the lens 100 for projection is constructed so as to satisfy the formula (C'), it is possible to obtain more desirable lens characteristics than the case of satisfying the formula (C).

[Structure Limited by Formula (D)]

The formula (D): $1.0 \leq d12/f \leq 2.7$ and the formula (D'): $1.4 < d12/f \leq 2.5$, which is more desirable than the formula (D), regulate the range of the ratio of air space d12 to focal length f of entire lens system. The air space d12 is a distance between the first lens and the second lens on optical axis Z1.

When the lens 100 for projection is constructed in such a manner that the value of d12/f is lower than the lower limit defined by the formula (D), correction of spherical aberration and correction of an image plane become difficult.

In contrast, when the lens 100 for projection is constructed in such a manner that the value of d12/f exceeds the upper limit defined by the formula (D), there is a problem that the size of a lens or lenses becomes large. Further, there is a problem that the back focus becomes short.

If the lens 100 for projection is constructed so as to satisfy the formula (D) or (D'), it is possible to suppress generation of such a problem. When the lens 100 for projection is constructed so as to satisfy the formula (D'), it is possible to obtain more desirable lens characteristics than the case of satisfying the formula (D).

[Structure Limited by Formula (E)]

The formula (E): $f34n/f \leq -2.5$ and the formula (E'): $f34n/f \leq -7.0$, which is more desirable than the formula (E), regulate the range of the ratio of focal length f34n of air lens L34 to focal length f of entire lens system (lens 100 for projection). The air lens L34 is provided between the reduction-side surface of the third lens and the magnification-side surface of the fourth lens.

If the lens 100 for projection is constructed in such a manner that the value of f34n/f exceeds the upper limit defined by the formula (E), there is a problem that correction of an image plane becomes difficult.

If the lens 100 for projection is constructed so as to satisfy the formula (E) or (E') it is possible to suppress generation of such a problem. When the lens 100 for projection is constructed so as to satisfy the formula (E'), it is possible to obtain more desirable lens characteristics than the case of satisfying the formula (E).

[Structure Limited by Formula (F)]

The formula (F): $Fno \leq 1.7$ regulates the range of the F-number of the lens 100 for projection.

It is desirable that the F-number of the lens 100 for projections is less than or equal to 1.7.

Further, one of the surfaces of the first lens L1 or both of the surfaces of the first lens L1 may be aspheric. Further, at least one of lens surfaces S10 through S13, which constitute the fifth lens L5 or the six lens L6, may be aspheric. When these lenses are constructed in such a manner, the first lens L1 and the sixth lens L6 may be made of transparent resin. Further, it is desirable that the formula (G): $-0.7 < f1/f6 \leq -0.1$ is satisfied. The formula (G) regulates the range of the ratio of focal length f1 of the first lens L1 made of resin to focal length f6 of the sixth lens L6 made of resin.

If the lens 100 for projection is constructed so as to satisfy the formula (G), a change in the focal length f1 of the first lens L1 due to a change in temperature can be offset by a change in the focal length f6 of the sixth lens L6 due to the change in temperature. Consequently, it is possible to suppress a shift in the focus position of the lens 100 for projection.

In contrast, when the lens 100 for projection is constructed in such a manner that the value of f1/f6 exceeds the upper limit defined by the formula (G) or is lower than the lower limit defined by the formula (G), it becomes difficult to make the change in the focal length f6 of the sixth lens L6 due to a change in temperature offset the change in the focal length f1 of the first lens L1 due to the change in temperature. Therefore, it becomes difficult to suppress a movement in the focus position of the lens 100 for projection caused by a change in temperature.

The lens for projection may be composed of only single lenses. Alternatively, the lens for projection may include a cemented lens or lenses.

SPECIFIC EXAMPLES

With reference to FIGS. 4 through 8 and FIGS. 9A-9D through 13A-13D, and Tables 1 through 6, Examples 1 through 5 of the lens for projection of the present invention and numerical data or the like of the examples will be described together.

FIGS. 4 through 8 are schematic cross sections illustrating the structure of the lenses for projection in Examples 1 through 5, respectively.

Figure 4:
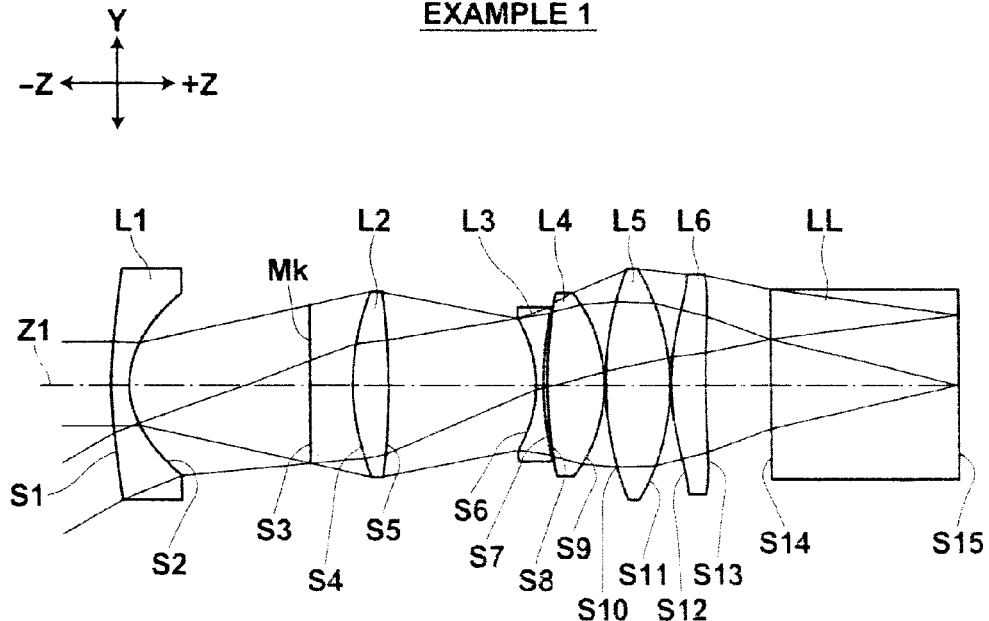
FIG. 4 is a schematic cross section illustrating the structure of a lens for projection in Example 1.
Figure 12A:
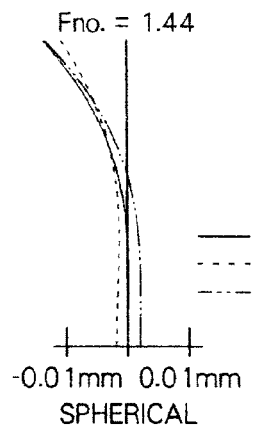
FIGS. 12A, 12B, 12C and 12D are diagrams illustrating various aberrations of the lens for projection in Example 4 (when the value of f3F/f is lower than the lower limit defined by the formula (B))
Figure 12B:
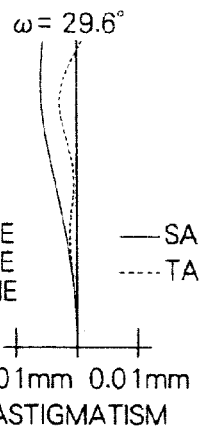
Figure 12C:
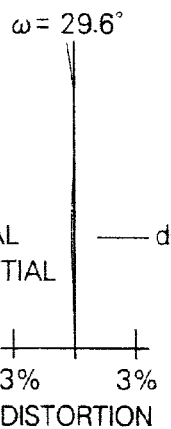
Figure 12D:
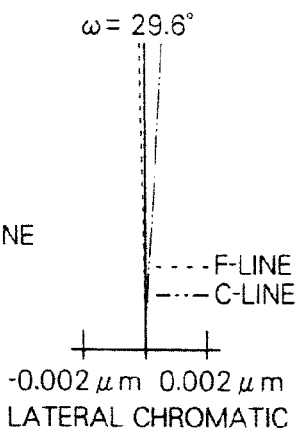
Figure 13A:
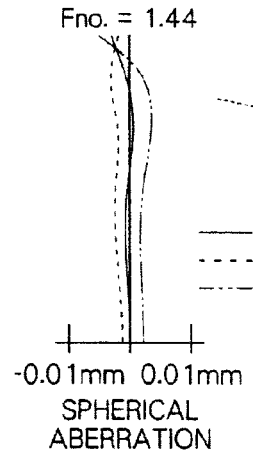
FIGS. 13A, 13B, 13C and 13D are diagrams illustrating various aberrations of the lens for projection in Example 5 (when the value of f3F/f exceeds the upper limit defined by the formula (B)).
Figure 13B:
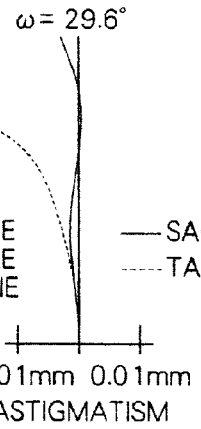
Figure 13C:
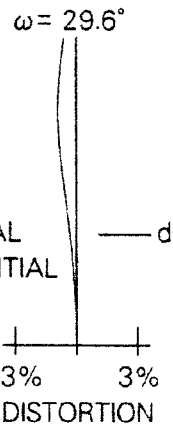
Figure 13D:
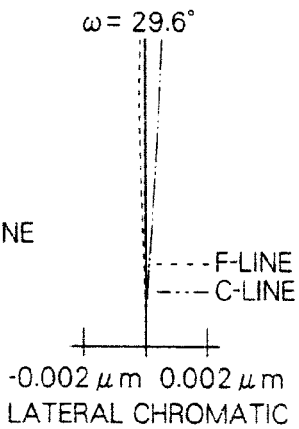

In FIG. 4, which is a cross section illustrating a lens for projection in Example 1, optical paths of light passing through the lens for projection are also illustrated. FIG. 4 shows that the reduction side of the lens for projection in Example 1 is telecentric. Further, in the lenses for projection in the other examples, namely, Examples 2 through 5, the reduction side of the lens for projection may be also telecentric.

In FIGS. 4 through 8, signs L1, represent lenses constituting the lenses for projection. The signs L1, L2, ... correspond to the order of arrangement of lenses from the magnification side (the side indicated by arrow −Z in FIGS. 4 through 8).

Further, sign LL represents an optical member, such as a TIR prism and a dichroic prism for combining colors, that constitutes a light modulation unit. The optical member LL does not constitute a lens for projection.

Tables 1 through 5 show basic data about the lenses for projection in Examples 1 through 5, respectively. The upper part (indicated by sign (a)) of each of Tables 1 through 5 shows lens data. The lower part (indicated by sign (b)) of each of Tables 1 through 5 shows aspheric coefficients. In the lens data, the mark "*" attached to a surface number indicates that a surface represented by the surface number is an aspheric surface.

Here, the following aspheric equation is used:

$$Z = \frac{Y^2/R}{1 + (1 - K \cdot Y^2/R^2)^{1/2}} + \sum_{i=3}^{n} A_i Y^i,$$

where

Z: the depth of an aspheric surface (the length of a perpendicular from a point on an aspheric surface at height Y to a flat plane perpendicular to the optical axis in contact with the vertex of the aspheric surface (mm), Y: height (a distance from the optical axis) (mm), R: the radius of curvature of a paraxial region of the aspheric surface, K, $A_i$ aspheric coefficients (i=3 through n).

Further, Table 6 shows values with respect to the lenses for projection in Examples 1 through 5. Table 6 shows values the ranges of which are defined by the inequations of formulas (A) through (G) (values calculated by arithmetic expressions in the inequations), or constants of optical systems of the lenses for projection, which are represented by signs in the inequations.

The lenses for projection in Examples 1 through 3 satisfy all of the formulas (A) through (G) at the same time. The lens for projection in Example 4 does not satisfy the formula (B), but satisfies all of formulas other than the formula (B), namely formulas (A) and (C) through (G), at the same time. The lens for projection in Example 5 satisfies neither the formula (B) nor the formula (E). However, the lens for projection in Example 5 satisfies all of formulas other than the formulas (B) and (E), namely Formulas (A), (C), (D), (F) and (G), at the same time. Example 4 shows a case in which the value of f3F/f is lower than the lower limit defined by the formula (B). Example 5 shows a case in which the value of f3F/f exceeds the upper limit defined by the formula (B).

In the lens data at the upper part of each of Tables 1 through 5, surface number Si represents the number of an i-th lens surface or the like (i=1, 2, 3, . . . ). The most-magnification-side surface is the first surface, and the surface numbers sequentially increase toward the reduction side (the side indicated by arrow +Z in FIGS. 4 through 8). The lens data include mask Mk and optical member LL.

In the lens data, the optical member LL is regarded as a parallel flat plate to be represented as data.

Radius Ri of curvature represents the radius of curvature of the i-th surface (i=1, 2, 3, . . . ). Distance Di between surfaces (i=1, 2, 3, . . . ) represents a distance between the i-th surface and an (i+1)th surface on optical axis Z1. The sign Ri and the sign Di in the lens data correspond to the sign Si (i=1, 2, 3, . . . ), which represents a lens surface or the like.

Further, the sign Ndj represents the refractive index of a j-th optical element (j=1, 2, 3, . . . ) with respect to d-line (wavelength is 587.6 nm). The most-magnification-side optical element is the first optical element, and numbers sequentially increase toward the reduction side. Further, the sign vdj represents the Abbe number of the j-th optical element based on d-line.

Abbe number v of an optical element based on d-line is obtained by the following equation:

$v = (Nd-1)/(NF-NC)$, where

NF is the refractive index of the optical member with respect to F-line (486.1 nm), Nd is the refractive index of the optical member with respect to d-line (587.6 nm), and NC is the refractive index of the optical member with respect to C-line (656.3 nm).

In Examples 1 through 5, lens L1 and lens L6 are made of resin.

In the lens data of Tables 1 through 5, the radii of curvature and distances between surfaces are normalized by assuming that the focal length of the entire system is 1. Further, the radius of curvature of a surface is positive when the surface is convex toward the magnification side, and negative when the surface is convex toward the reduction side.

Tables 1 through 6 are provided together at the end of the section of "DESCRIPTION OF THE PREFERRED EMBODIMENTS".

FIGS. 9A, 9B, 9C, 9D through FIGS. 13A, 13B, 13C, 13D are diagrams illustrating various aberrations (spherical aberration, astigmatism, distortion, and lateral chromatic aberration, respectively) of the lenses for projection in Examples 1 through 5. Aberrations with respect to d-line, F-line or C-line are illustrated.

In the diagrams illustrating distortions, a shift amount from an ideal image height f×tan θ is illustrated. The ideal image height f×tan θ is obtained by using focal length f of entire lens system and half angle θ of view (θ is a variable, and $0 \leq \theta \leq \omega$).

As the numerical data about Examples 1 through 5, the diagrams illustrating aberrations and the like show, these lenses for projection of the present invention have small F-numbers (in other words, fast lenses), while generation of aberrations and an increase in the size of apparatuses are suppressed.

The present invention is not limited to the aforementioned examples, and various modifications are possible without departing from the gist of the present invention. For examples, the values of the radius of curvature of each lens, a distance between surfaces, a refractive index and the like are not limited to the values in the tables, but may be other values.

TABLE 1

EXAMPLE 1

(a)

| SURFACE NUMBER Si | LENS DATA | | | |
|---|---|---|---|---|
| | Ri | Di | Ndj | vdj |
| *1 | 2.076 | 0.15 | 1.4910 | 57.6 |
| *2 | 0.596 | 1.50 | | |
| 3 | 0.000 | 0.36 | (MASK) | |
| 4 | 1.971 | 0.30 | 1.7234 | 38.0 |
| 5 | −5.978 | 1.23 | | |
| 6 | −1.057 | 0.06 | 1.8052 | 25.4 |

TABLE 1-continued

EXAMPLE 1

| | | | | |
|---|---|---|---|---|
| 7 | 2.995 | 0.03 | | |
| 8 | 4.023 | 0.47 | 1.5163 | 64.1 |
| 9 | −1.241 | 0.01 | | |
| 10 | 2.581 | 0.53 | 1.4875 | 70.2 |
| 11 | −1.874 | 0.01 | | |
| *12 | 2.027 | 0.28 | 1.4910 | 57.6 |
| *13 | 10.189 | 0.54 | | |
| 14 | ∞ | 1.54 | 1.5163 | 64.1 |
| 15 | ∞ | | | |

(b)

| SURFACE NUMBER Si | ASPHERIC COEFFICIENT | | | | | | |
|---|---|---|---|---|---|---|---|
| | K | A3 | A4 | A5 | A6 | A7 | A8 |
| 1 | 1.0000 | −2.036285E−01 | 1.460843E−01 | −9.539754E−01 | 1.860924E+00 | −2.886551E−02 | −3.322990E+00 |
| 2 | 0.0000 | −2.100422E−01 | 1.316499E−01 | −1.268034E−01 | −5.027304E−01 | 1.890130E+00 | 1.625919E+00 |
| 12 | 1.0000 | 0.000000E+00 | −5.625299E−02 | 3.760522E−02 | −6.833509E−02 | −7.433341E−03 | −2.175293E−02 |
| 13 | 1.0000 | 0.000000E+00 | −2.203896E−02 | 5.812136E−02 | −7.846308E−02 | −3.719954E−03 | −4.687628E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.534032E+00 | −1.237622E+00 | 2.546227E−02 | 1.445367E−02 | 7.126354E−03 | 3.228488E−03 |
| 2 | −7.546776E+00 | 5.304482E+00 | −2.235082E−01 | −1.234160E−01 | −6.223058E−02 | −2.957825E−02 |
| 12 | 5.693560E−03 | −4.187370E−02 | 0.000000E+00 | 0.000000E+00 | 0.000000E+00 | 0.000000E+00 |
| 13 | −2.365584E−04 | 3.730573E−03 | 0.000000E+00 | 0.000000E+00 | 0.000000E+00 | 0.000000E+00 |

(SIGN "*" REPRESENTS AN ASPHERIC SURFACE)

TABLE 2

EXAMPLE 2

(a)

| SURFACE NUMBER Si | LENS DATA | | | |
|---|---|---|---|---|
| | Ri | Di | Ndj | vdj |
| *1 | 2.274 | 0.15 | 1.4910 | 57.6 |
| *2 | 0.614 | 1.50 | | |
| 3 | 0.000 | 0.33 | (MASK) | |
| 4 | 1.936 | 0.29 | 1.7234 | 38.0 |
| 5 | −6.330 | 1.23 | | |
| 6 | −1.050 | 0.06 | 1.8052 | 25.4 |
| 7 | 2.981 | 0.03 | | |
| 8 | 4.935 | 0.46 | 1.5163 | 64.1 |
| 9 | −1.243 | 0.01 | | |
| 10 | 2.508 | 0.58 | 1.4875 | 70.2 |
| 11 | −1.737 | 0.01 | | |
| *12 | 1.975 | 0.28 | 1.4910 | 57.6 |
| *13 | 9.421 | 0.54 | | |
| 14 | ∞ | 1.54 | 1.5163 | 64.1 |
| 15 | ∞ | | | |

(b)

| SURFACE NUMBER Si | ASPHERIC COEFFICIENT | | | | | | |
|---|---|---|---|---|---|---|---|
| | K | A3 | A4 | A5 | A6 | A7 | A8 |
| 1 | 1.0000 | −1.595363E−01 | 1.183457E−01 | −9.719508E−01 | 1.893372E+00 | −2.629297E−02 | −3.333883E+00 |
| 2 | 0.0000 | −1.572701E−01 | 6.579542E−02 | −8.918996E−02 | −5.097670E−01 | 1.880893E+00 | 1.635896E+00 |
| 12 | 1.0000 | 0.000000E+00 | −5.778475E−02 | 3.942599E−02 | −5.965888E−02 | −6.449017E−03 | −3.035045E−02 |
| 13 | 1.0000 | 0.000000E+00 | −2.996830E−02 | 7.613995E−02 | −7.921494E−02 | −1.174333E−02 | −5.130898E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.531896E+00 | −1.238662E+00 | 2.639652E−02 | 1.532078E−02 | 7.675636E−03 | 3.523095E−03 |
| 2 | −7.544198E+00 | 5.305707E+00 | −2.289742E−01 | −1.281002E−01 | −6.528477E−02 | −3.131123E−02 |

TABLE 2-continued

EXAMPLE 2

| | | | | | | |
|---|---|---|---|---|---|---|
| 12 | −9.497487E−04 | −4.429695E−02 | 0.000000E+00 | 0.000000E+00 | 0.000000E+00 | 0.000000E+00 |
| 13 | −3.289552E−03 | 1.115004E−03 | 0.000000E+00 | 0.000000E+00 | 0.000000E+00 | 0.000000E+00 |

(SIGN "*" REPRESENTS AN ASPHERIC SURFACE)

TABLE 3

EXAMPLE 3

(a)

| SURFACE NUMBER Si | LENS DATA | | | |
|---|---|---|---|---|
| | Ri | Di | Ndj | νdj |
| *1 | 2.799 | 0.16 | 1.4910 | 57.6 |
| *2 | 0.624 | 1.65 | | |
| 3 | 0.000 | 0.10 | (MASK) | |
| 4 | 2.129 | 0.29 | 1.6762 | 37.3 |
| 5 | −5.432 | 1.48 | | |
| 6 | −1.025 | 0.06 | 1.7847 | 26.3 |
| 7 | 3.441 | 0.02 | | |
| 8 | 4.721 | 0.38 | 1.4875 | 70.2 |
| 9 | −1.321 | 0.01 | | |
| *10 | 2.702 | 0.67 | 1.5365 | 63.6 |
| *11 | −1.575 | 0.01 | | |
| *12 | 2.338 | 0.27 | 1.4910 | 57.6 |
| *13 | 18.886 | 0.67 | | |
| 14 | ∞ | 1.63 | 1.5163 | 64.1 |
| 15 | ∞ | | | |

(b)

| SURFACE NUMBER Si | ASPHERIC COEFFICIENT | | | | | | |
|---|---|---|---|---|---|---|---|
| | K | A3 | A4 | A5 | A6 | A7 | A8 |
| 1 | 1.0000 | −1.487622E−01 | 1.061826E−01 | −7.772136E−01 | 1.423734E+00 | −1.743163E−02 | −2.237300E+00 |
| 2 | 0.0000 | −1.423979E−01 | 3.566732E−02 | −7.013887E−02 | −3.815753E−01 | 1.334069E+00 | 1.091733E+00 |
| 10 | 1.0000 | 0.000000E+00 | 5.367273E−03 | −1.559597E−04 | −3.505360E−03 | −2.353013E−03 | 9.284561E−05 |
| 11 | 1.0000 | 0.000000E+00 | 1.018729E−02 | 2.048330E−03 | 4.043884E−03 | 3.421017E−03 | 7.978354E−04 |
| 12 | 1.0000 | 0.000000E+00 | −5.210003E−02 | 3.392131E−02 | −4.385224E−02 | −4.416626E−03 | −2.005016E−02 |
| 13 | 1.0000 | 0.000000E+00 | −1.479955E−02 | 6.295582E−02 | −5.665995E−02 | −5.949194E−03 | −3.381479E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 2.239019E+00 | −7.420469E−01 | 1.481514E−02 | 8.135563E−03 | 3.854889E−03 | 1.673169E−03 |
| 2 | −4.788826E+00 | 3.174417E+00 | −1.309581E−01 | −6.905135E−02 | −3.319774E−02 | −1.502757E−02 |
| 10 | 7.031417E−04 | 3.455935E−04 | 0.000000E+00 | 0.000000E+00 | 0.000000E+00 | 0.000000E+00 |
| 11 | −2.600831E−04 | −2.663107E−04 | 0.000000E+00 | 0.000000E+00 | 0.000000E+00 | 0.000000E+00 |
| 12 | −1.524929E−04 | −2.622061E−02 | 0.000000E+00 | 0.000000E+00 | 0.000000E+00 | 0.000000E+00 |
| 13 | −2.243328E−03 | 4.655150E−04 | 0.000000E+00 | 0.000000E+00 | 0.000000E+00 | 0.000000E+00 |

(SIGN "*" REPRESENTS AN ASPHERIC SURFACE)

TABLE 4

EXAMPLE 4

(a)

| SURFACE NUMBER Si | LENS DATA | | | |
|---|---|---|---|---|
| | Ri | Di | Ndj | νdj |
| *1 | 1.791 | 0.15 | 1.4910 | 57.6 |
| *2 | 0.548 | 1.21 | | |
| 3 | 3.267 | 0.26 | 1.7495 | 35.3 |
| 4 | −4.447 | 0.30 | | |
| 5 | 0.000 | 1.58 | (MASK) | |
| 6 | −1.863 | 0.06 | 1.8052 | 25.4 |
| 7 | 2.955 | 0.04 | | |
| 8 | 6.889 | 0.41 | 1.5891 | 61.1 |

TABLE 4-continued

EXAMPLE 4

| | | | | |
|---|---|---|---|---|
| 9 | −1.511 | 0.01 | | |
| 10 | 2.365 | 0.57 | 1.4875 | 70.2 |
| 11 | −1.902 | 0.01 | | |
| *12 | 1.882 | 0.28 | 1.4910 | 57.6 |
| *13 | 5.371 | 0.55 | | |
| 14 | ∞ | 1.54 | 1.5163 | 64.1 |
| 15 | ∞ | | | |

(b)

| SURFACE NUMBER Si | ASPHERIC COEFFICIENT | | | | | |
|---|---|---|---|---|---|---|
| | K | A3 | A4 | A5 | A6 | A7 | A8 |
| 1 | 1.0000 | −2.468749E−01 | 9.824468E−02 | −9.596039E−01 | 1.934428E+00 | −2.892073E−02 | −3.368592E+00 |
| 2 | 0.0000 | −2.520147E−01 | 3.742659E−02 | −7.120096E−02 | −5.156327E−01 | 1.881388E+00 | 1.644290E+00 |
| 12 | 1.0000 | 0.000000E+00 | −6.283461E−02 | 3.795817E−02 | −5.756677E−02 | −7.368125E−03 | −3.081068E−02 |
| 13 | 1.0000 | 0.000000E+00 | −5.997172E−02 | 7.092891E−02 | −8.315592E−02 | −9.319250E−03 | −4.649441E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.533816E+00 | −1.243486E+00 | 2.942689E−02 | 1.780310E−02 | 9.148347E−03 | 4.276213E−03 |
| 2 | −7.581279E+00 | 5.296253E+00 | −2.618076E−01 | −1.503497E−01 | −7.790301E−02 | −3.779649E−02 |
| 12 | 2.564384E−03 | −3.928465E−02 | 0.000000E+00 | 0.000000E+00 | 0.000000E+00 | 0.000000E+00 |
| 13 | −4.620353E−04 | 2.063738E−03 | 0.000000E+00 | 0.000000E+00 | 0.000000E+00 | 0.000000E+00 |

(SIGN "*" REPRESENTS AN ASPHERIC SURFACE)

TABLE 5

EXAMPLE 5

(a)

| SURFACE NUMBER Si | LENS DATA | | | |
|---|---|---|---|---|
| | Ri | Di | Ndj | νdj |
| *1 | 2.130 | 0.15 | 1.4910 | 57.6 |
| *2 | 0.550 | 1.52 | | |
| 3 | 0.000 | 0.00 | (MASK) | |
| 4 | 1.336 | 0.39 | 1.7200 | 43.7 |
| 5 | 37.388 | 1.35 | | |
| 6 | −0.542 | 0.06 | 1.8052 | 25.4 |
| 7 | −3.108 | 0.02 | | |
| 8 | −2.468 | 0.48 | 1.5163 | 64.1 |
| 9 | −0.719 | 0.01 | | |
| 10 | 1.386 | 0.65 | 1.4875 | 70.2 |
| 11 | −5.719 | 0.01 | | |
| *12 | 1.848 | 0.21 | 1.4910 | 57.6 |
| *13 | 8.249 | 0.55 | | |
| 14 | ∞ | 1.54 | 1.5163 | 64.1 |
| 15 | ∞ | | | |

(b)

| SURFACE NUMBER Si | ASPHERIC COEFFICIENT | | | | | |
|---|---|---|---|---|---|---|
| | K | A3 | A4 | A5 | A6 | A7 | A8 |
| 1 | 1.0000 | −1.497660E−01 | 7.413793E−02 | −9.736763E−01 | 1.896506E+00 | −2.417086E−02 | −3.334207E+00 |
| 2 | 0.0000 | −1.631830E−01 | 1.409167E−01 | −1.624759E−01 | −5.697741E−01 | 1.848181E+00 | 1.620035E+00 |
| 12 | 1.0000 | 0.000000E+00 | −5.849441E−02 | 3.485991E−02 | −6.212584E−02 | −1.055966E−02 | −3.393616E−02 |
| 13 | 1.0000 | 0.000000E+00 | 4.234118E−02 | 9.703144E−02 | −6.590297E−02 | −1.469057E−03 | −4.466862E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.536537E+00 | −1.238885E+00 | 2.692512E−02 | 1.558278E−02 | 7.789865E−03 | 3.567452E−03 |
| 2 | −7.559253E+00 | 5.306084E+00 | −2.317715E−01 | −1.296279E−01 | −6.611049E−02 | −3.172791E−02 |

TABLE 5-continued

| | | EXAMPLE 5 | | | | |
|---|---|---|---|---|---|---|
| 12 | −3.255063E−03 | −4.566054E−02 | 0.000000E+00 | 0.000000E+00 | 0.000000E+00 | 0.000000E+00 |
| 13 | 4.371219E−04 | 3.269438E−03 | 0.000000E+00 | 0.000000E+00 | 0.000000E+00 | 0.000000E+00 |

(SIGN "*" REPRESENTS AN ASPHERIC SURFACE)

TABLE 6

| ARITHMETIC FORMULA, ETC. IN INEQUATION No | ARITHMETIC EXPRESSION, IN INEQUATION | VALUE CALCULATED BY ARITHMETIC EXPRESSION IN INEQUATION | | | | |
|---|---|---|---|---|---|---|
| | | EXAMPLE 1 | EXAMPLE 2 | EXAMPLE 3 | EXAMPLE 4 | EXAMPLE 5 |
| (A) | Bf/f | 1.6 | 1.6 | 1.7 | 1.6 | 1.6 |
| (B) | f3F/f | −1.3 | −1.3 | −1.3 | −2.3 | −0.7 |
| (C) | f/f12 | 0.4 | 0.4 | 0.3 | 0.1 | 0.4 |
| (D) | d12/f | 1.9 | 1.8 | 1.8 | 1.2 | 1.5 |
| (E) | f34n/f | −7.2 | −6.1 | −8.0 | −5.4 | 19.7 |
| (F) | Fno | 1.4 | 1.4 | 1.4 | 1.4 | 1.4 |
| (G) | f1/f6 | −0.3 | −0.4 | −0.3 | −0.3 | −0.3 |

What is claimed is:

1. A lens for projection substantially consisting of six lenses,
wherein the reduction side of the lens for projection is telecentric, and
wherein a negative first lens having a concave surface facing the reduction side, a positive second lens having a convex surface facing the magnification side of the lens for projection, a negative third lens having a concave surface facing the magnification side, a positive fourth lens having a convex surface facing the reduction side, a positive fifth lens, and a positive sixth lens are arranged in this order from the magnification side, and
wherein the following formula (A) is satisfied:

$$1.2 \leq Bf/f \leq 2.5 \quad (A),$$

where
Bf: back focus in air of the entire lens system of the lens for projection, and
f: focal length of the entire lens system.

2. A lens for projection, as defined in claim 1, wherein the following formula (B) is satisfied:

$$-2.0 \leq f3F/f \leq -0.8 \quad (B),$$

where
f3F: focal length of a magnification-side surface of the third lens.

3. A lens for projection, as defined in claim 2, wherein the following formula (C) is satisfied:

$$0.0 < f/f12 \leq 0.8 \quad (C),$$

where
f12: combined focal length of the first lens and the second lens.

4. A lens for projection, as defined in claim 3, wherein the following formula (D) is satisfied:

$$1.0 \leq d12/f \leq 2.7 \quad (D),$$

where
d12: air space between the first lens and the second lens.

5. A lens for projection, as defined in claim 4,
wherein a gap is provided between a reduction-side surface of the third lens and a magnification-side surface of the fourth lens, and
wherein the following formula (E) is satisfied:

$$f34n/f \leq -2.5 \quad (E),$$

where
f34n: focal length of an air lens formed between the reduction-side surface of the third lens and the magnification-side surface of the fourth lens.

6. A lens for projection, as defined in claim 5, wherein the following formula (F) is satisfied:

$$Fno \leq 1.7 \quad (F),$$

where
Fno: F-number of the entire lens system.

7. A lens for projection, as defined in claim 6, wherein at least a surface of the first lens is aspheric.

8. A lens for projection, as defined in claim 7, wherein at least one of surfaces constituting the fifth lens or the sixth lens is aspheric.

9. A lens for projection, as defined in claim 8, wherein the first lens and the six lens are made of resin, and wherein the following formula (G) is satisfied:

$$-0.7 < f1/f6 \leq -0.1 \quad (G),$$

where
f1: focal length of the first lens, and
f6: focal length of the sixth lens.

10. A lens for projection, as defined in claim 1, wherein the following formula (C) is satisfied:

$$0.0 < f/f12 \leq 0.8 \quad (C),$$

where
f12: combined focal length of the first lens and the second lens.

11. A lens for projection, as defined in claim 1, wherein the following formula (D) is satisfied:

$$1.0 \leq d12/f \leq 2.7 \quad (D),$$

where
d12: air space between the first lens and the second lens.

12. A lens for projection, as defined in claim 1,
wherein a gap is provided between a reduction-side surface of the third lens and a magnification-side surface of the fourth lens, and
wherein the following formula (E) is satisfied:

$$f34n/f \leq -2.5 \quad (E),$$

where
f34n: focal length of an air lens formed between the reduction-side surface of the third lens and the magnification-side surface of the fourth lens.

13. A lens for projection, as defined in claim 1, wherein the following formula (F) is satisfied:

$$Fno \leq 1.7 \quad (F),$$

where
Fno: F-number of the entire lens system.

14. A lens for projection, as defined in claim 1, wherein at least a surface of the first lens is aspheric.

15. A lens for projection, as defined in claim 14, wherein at least one of surfaces constituting the fifth lens or the sixth lens is aspheric.

16. A lens for projection, as defined in claim 15, wherein the first lens and the six lens are made of resin, and wherein the following formula (G) is satisfied:

$$-0.7 < f1/f6 \leq -0.1 \quad (G),$$

where
f1: focal length of the first lens, and
f6: focal length of the sixth lens.

17. A projection-type display apparatus comprising:
a lens for projection, as defined in claim 1;
a light source; and
a light valve that modulates rays of light output from the light source,
wherein the rays of light modulated by the light valve are projected through the lens for projection.

* * * * *